No. 649,016. Patented May 8, 1900.
L. THURNS, GEB. WIESE.
ELASTIC TIRE FOR CYCLES.
(Application filed June 12, 1899.)
(No Model.)
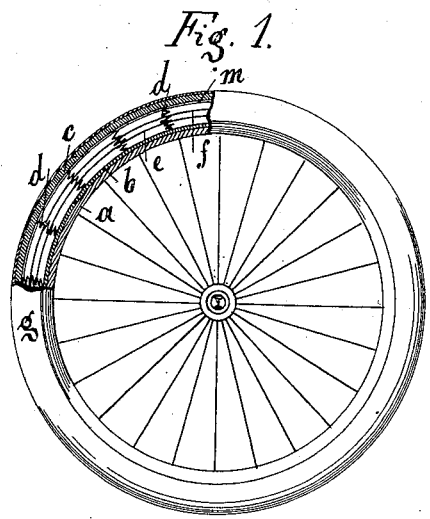
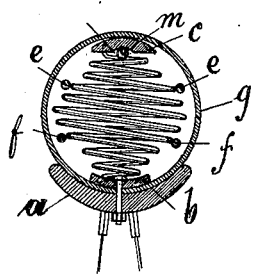 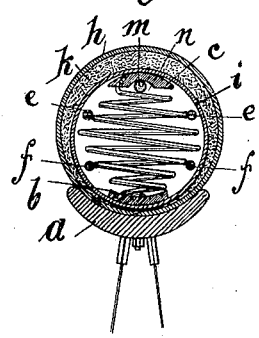
Witnesses:
Inventor:
Luise Thurns, geb. Wiese

UNITED STATES PATENT OFFICE.

LUISE THURNS, GEBOREN WIESE, OF ALTONA, GERMANY.

ELASTIC TIRE FOR CYCLES.

SPECIFICATION forming part of Letters Patent No. 649,016, dated May 8, 1900.

Application filed June 12, 1899. Serial No. 720,325. (No model.)

*To all whom it may concern:*

Be it known that I, LUISE THURNS, *geborene* WIESE, a subject of the King of Prussia, German Emperor, residing at 36 Parallel-strasse, Altona, Germany, have invented new and useful Improvements in Elastic Tires for Cycles and Similar Vehicles, of which the following is a specification.

The present invention refers to improvements in elastic tires for cycles and similar vehicles which have for their purpose to produce a tire distinguished by extreme lightness combined with durability, the elasticity of the tire being attained by mechanical means in contradistinction to the usual pneumatic tires.

I will now proceed to describe my invention more fully, reference being had to the accompanying drawings, in which—

Figure 1 shows a side elevation of a complete wheel, part of the tire-cover being removed. Fig. 2 is a section through my improved tire. Fig. 3 is a section through a somewhat-modified tire.

My improved tire is composed of the usual rim $a$, into which a ring $b$ fits, which may be secured to said rim by suitable means. On the ring $b$ a number of spiral springs $d$ are mounted and secured thereon by means of bolts or screws. These spiral springs are of a doubly-conical shape—*i. e.*, they taper toward the top and bottom end in external shape, the greatest diameter being in the center portion. The other extremity of the spring $d$ is secured to a second ring $c$ by means of bolts, screws, or in any other suitable manner. This outer ring $c$ is suitably made of cane, the surface being made smooth and curved in cross-section. An annular groove $m$ is provided in the internal surface of the ring $c$, which groove $m$ receives a steel-wire ring $n$. At either side of the spiral springs $d$ wire rings $e\ e\ f\ f$ are secured for the purpose of preventing a lateral displacement of the springs when in position and in use.

All the parts enumerated above, with the exception of the outer ring $c$, are made of steel or steel wire respectively. I wish it, however, to be understood that I do not restrict myself to the employment of steel alone, as any other material may be used which answers the purpose—such as, for instance, aluminium, &c. A protective cover $g$ surrounds the spiral springs $d$ and their accessories above described. This protective cover is made of india-rubber or any other suitable and elastic material.

As shown in Fig. 3, the protective cover may consist of a double layer $h\ i$ of canvas, a layer $k$ of camel's hair or other suitable material being interposed between.

The employment of cane for the outer ring $c$ renders the wheel-tire very smooth and attains a uniform action, while simultaneously the arrangement of the steel-wire ring $n$ in the annular groove of said ring serves for preventing breaking of the ring $c$.

Having now described my invention, what I claim as new, and desire to secure by Letters Patent, is—

1. In an elastic tire for the wheels of cycles and similar vehicles the combination of an inner ring $b$ in connection with the rim $a$, an outer ring $c$ of cane curved externally and provided with an annular groove in the inner plane surface, a steel-wire ring $n$ inserted in said groove spiral springs $d$ of doubly-conical shape arranged between said two rings and wire rings $e\ f$ arranged at the sides of the spiral springs the whole being incased in a protective cover of india-rubber or other suitable material, substantially as and for the purposes set forth.

2. In an elastic tire for vehicles, in combination, a pair of concentric rings, the inner one being secured to the ordinary rim, doubly-conical helical springs interposed radially between the two concentric rings, a pair of wire rings secured to the central coil of the helical springs at either side of the rim to prevent lateral strain of the springs and an outer protective cover surrounding the two concentric rings and secured to the inner one of same and the ordinary rim, substantially as described and shown.

In testimony whereof I have hereunto set my hand in presence of two subscribing witnesses.

LUISE THURNS, GEB. WIESE.

Witnesses:
 E. H. L. MUMMENHOFF,
 OTTO W. HELLMRICH.